(12) United States Patent  (10) Patent No.: US 8,917,403 B2
Osada  (45) Date of Patent: Dec. 23, 2014

(54) COMMUNICATION ESTABLISHMENT ASSISTING SYSTEM AND ELECTRONIC APPARATUS

(71) Applicant: Kyocera Document Solutions Inc., Osaka-shi, Osaka (JP)

(72) Inventor: Yoshihiro Osada, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 13/936,394

(22) Filed: Jul. 8, 2013

(65) Prior Publication Data

US 2014/0022577 A1  Jan. 23, 2014

(30) Foreign Application Priority Data

Jul. 20, 2012  (JP) .................................. 2012-161279

(51) Int. Cl.
*G06F 3/12* (2006.01)
*H04N 1/00* (2006.01)
*G06K 15/00* (2006.01)

(52) U.S. Cl.
CPC .... *H04N 1/00204* (2013.01); *H04N 2201/0074* (2013.01); *H04N 2201/0039* (2013.01); *H04N 2201/0094* (2013.01)
USPC ......................................... 358/1.13; 358/1.15

(58) Field of Classification Search
CPC ..... G06F 3/1204; G06F 3/1286; G06F 3/126; G06F 3/1205; G06K 15/408; G06K 15/4095
USPC .............. 358/1.1, 1.13, 1.14, 1.15, 1.18, 400; 709/203, 217, 224, 223; 340/4.61, 4.62
See application file for complete search history.

(56) References Cited

U.S. PATENT DOCUMENTS

| | | | |
|---|---|---|---|
| 8,250,136 B2 * | 8/2012 | Maekawa et al. | 709/203 |
| 2003/0184787 A1 * | 10/2003 | Kuroda et al. | 358/1.13 |
| 2005/0060649 A1 * | 3/2005 | Kimura et al. | 715/526 |

FOREIGN PATENT DOCUMENTS

| | | |
|---|---|---|
| JP | 2003-202986 | 7/2003 |
| JP | 2005-301608 | 10/2005 |
| JP | 2006-127218 | 5/2006 |
| JP | 2008-040914 | 2/2008 |
| JP | 2008-059238 | 3/2008 |
| JP | 2009-169966 | 7/2009 |
| JP | 2011-008386 | 1/2011 |
| JP | 2011-180642 | 9/2011 |

* cited by examiner

*Primary Examiner* — Gabriel Garcia (57) ABSTRACT

A communication establishment assisting system includes: an electronic apparatus arranged on a first network; and a server device arranged on a second network different from the first network and configured to provide a control driver to be installed in the information processing terminal. The information processing terminal includes: an input unit that communication setting information is inputted to; a transmitting unit configured to transmit the communication setting information to the server device; and a receiving unit configured to receive the control driver from the server device to control the electronic apparatus. The server device includes: a receiving unit configured to receive the communication setting information from the information processing terminal; a setting information applying unit configured to apply the communication setting information to the control driver to be transmitted to the information processing terminal; and a transmitting unit configured to transmit the control driver to the information processing terminal.

6 Claims, 6 Drawing Sheets

COMMUNICATION ESTABLISHMENT ASSISTING SYSTEM AND ELECTRONIC APPARATUS

CROSS-REFERENCE TO RELATED APPLICATIONS

This application relates to and claims priority rights from a Japanese Patent Application No. 2012-161279, filed on Jul. 20, 2012, the entire disclosures of which are hereby incorporated by reference herein.

BACKGROUND

1. Field of the Invention

The present disclosure relates to a communication establishment assisting system and an electronic apparatus.

2. Description of the Related Art

Recently, some offices and other places use a multi function peripheral (MFP) which has a scanner function, a facsimile function, a printer function, a copier function and so forth. Most multi function peripherals are used with a connection to an information processing terminal such as a personal computer via a network such as a LAN (Local Area Network). The multi function peripherals may act as an image forming apparatus which performs printing on a sheet on the basis of image data inputted from the information processing terminal, may act as an image scanning apparatus which obtains image data to be used in the information processing terminal, and may act as a document managing apparatus which stores document image data so as to be enabled to be retrieved.

To use such a multi function peripheral, it is required to install a control driver in an information processing terminal connected to the multi function peripheral via a network, and the control driver performs sorts of control of the multi function peripheral such as control of the image scanning apparatus and control of the image forming apparatus. Such a control driver can be installed by executing an installer program in the information processing terminal. For example, such installer programs are prepared for respective types of multi function peripheral, and require input of setting items used to establish communication connection between the multi function peripheral and the information processing terminal in its installing process. Therefore, if a user is not familiar with the network and the target multi function peripheral and the user carries out installation of the control driver, it is difficult to finish the installation completely.

To solve this problem, sorts of techniques on installation of a control driver have been proposed. For example, an installer program of a driver searches for a network peripheral which connects to an information processing terminal via a network and obtains peripheral information transmitted from the network peripheral, and searches for a local peripheral which connects to a local port of the information processing terminal and obtains peripheral information of the local peripheral. If a driver can be installed for the network peripheral and/or the local peripheral, this installer program registers the network peripheral and/or the local peripheral in a peripheral list on the basis of the obtained peripheral information and a driver file stored in a driver file storage unit of the information processing terminal. When a user selects a peripheral in the peripheral list, a driver of the selected peripheral is installed.

Another installer program searches for a printer on a network, and obtains device configuration information such a manufacturer name and a device type name from the printer. If a driver file is stored in an information processing terminal, this installer program installs a driver of the driver file, and if a driver file is not stored in an information processing terminal, this installer program downloads and installs a compatible driver.

Further, to install a driver, another installer program searches for a printing device connected to a network and a printing device connected locally, and displays the printing device for which a driver can be installed so as to enable a user to select it. When a printing device is specified to install a driver among the displayed printing device, this installer program obtains option configuration information and resource information from the printing device, writes the obtained information into the driver, and installs the driver to an information processing terminal.

Further, a printer downloads and stores the latest version of a printer driver from an external server device as a distributor of the printer driver. In this technique, an information processing terminal connected to the printer via a network can obtain and install the latest version of the printer driver from the printer.

Furthermore, an image forming apparatus generates a temporal ID and a temporal password for a guest on the basis of an instruction of an administrator and generates a 2D code which includes the ID for a guest and a path of a web page. The administrator scans the 2D code using an imaging device from the image forming apparatus, and sends the scanned information to an outsider using an email. The outsider accesses the web page displayed by the image forming apparatus on the basis of the information, downloads a driver, and installs the driver in the outsider's information processing terminal. Consequently, printing is available with the image forming apparatus in a predetermined time.

For example, in an office or the like operating a large scale network on which plural multi function peripherals are arranged, when a user wants to temporarily connect an information processing terminal to an image forming apparatus in front of the user to use the image forming apparatus, the user is required to install a control driver in the information processing terminal in order to control the image forming apparatus. Even if the control driver capable of controlling the image forming apparatus has been installed in the information processing terminal, the user must set information to control the image forming apparatus.

For example, using the aforementioned technique, if a user can connect the information processing terminal to the network (can let the information processing terminal to join the network), the user can properly install the control driver relatively easily even if the user is not familiar with the network and the target multi function peripheral.

However, to search for a multi function peripheral in a large scale network a long searching time is required to search a large address range, and since a lot of network devices other than the multi function peripheral are connected to the network, such a lot of network devices are detected as the searching result. Further, if plural multi function peripherals of a same type are arranged on the network, it is difficult to specify the target multi function peripheral among the plural multi function peripherals displayed as the searching result. Furthermore, since such searching is performed in the whole address range, a lot of network traffic may result in depressing a performance of the network, and such searching may be regarded as a malicious attack. Therefore, the aforementioned techniques of the installer program and the printer are not sufficient as solutions of the problems. In addition, in an office operating a large scale network, connecting a device without permission to the network is often prohibited, and therefore, techniques subject to connecting to the network can often not be applied, such as the aforementioned techniques of the installer program and the printer.

On the other hand, in the aforementioned technique of the image forming apparatus, connection to a network is established substantially after an administrator's permission, and thus, it is not the situation that it is possible to connect a device to the network without permission. However, since the administrator which issues an ID and a password is not always available, in this technique, when a user wants to temporarily use the multi function peripheral, the user may not able to immediately use it. Further, obligating the administrator to be always available results in a lot of the administrator's burden, and therefore, it is impracticable. Furthermore, in the aforementioned technique of the image forming apparatus, since the image forming apparatus must be configured to store a control driver and distribute the control driver through a web page displayed by itself, the problem arises that it is difficult to apply this to a low cost machine.

SUMMARY

A communication establishment assisting system according to an aspect of the present disclosure includes: an electronic apparatus and a server device. In this communication establishment assisting system, a driver to control the electronic apparatus is provided to an information processing terminal which is not connected to a network on which the electronic apparatus is arranged.

The electronic apparatus is arranged on a first network and configured to be controlled by an information processing terminal that a control driver is installed in. The server device is arranged on a second network different from the first network and configured to provide the control driver to be installed in the information processing terminal.

The information processing terminal includes: an input unit, a transmitting unit, and a receiving unit. To the input unit, communication setting information is inputted, and the communication setting information includes information to uniquely identify the electronic apparatus. The transmitting unit is configured to transmit the communication setting information to the server device. The receiving unit is configured to receive the control driver from the server device to control the electronic apparatus. Meanwhile, the server device includes a receiving unit, a setting information applying unit, and a transmitting unit. The receiving unit is configured to receive the communication setting information transmitted from the information processing terminal. The setting information applying unit is configured to apply the received communication setting information to the control driver to be transmitted to the information processing terminal. The transmitting unit is configured to transmit the control driver to which the communication setting information has been applied to the information processing terminal.

In the communication establishment assisting system, in the situation that the information processing terminal to be enabled to control the electronic apparatus is not connected to a first network on which the electronic apparatus is arranged, it is possible to acquire a control driver to which communication setting information to control the electronic apparatus has been applied via a second network from the server device. To this control driver, the communication setting information has been applied for the electronic apparatus to be controlled, and therefore, upon installing it to the information processing terminal, the information processing terminal is in a status enabled to control the electronic apparatus to be controlled. Thus, after installing the control driver, when the information processing terminal is connected to the first network using wired communication or wireless communication, the information processing terminal is enabled to control the electronic apparatus. Therefore, it is possible to easily install the driver to the information processing terminal without searching it on the network while the information processing terminal is connected to the network. The electronic apparatus is not limited to a specific type and it is capable of easily applying to a low cost machine.

An electronic apparatus according to another aspect of the present disclosure is an electronic apparatus is arranged on a network and controlled by an information processing terminal that a control driver is installed in. The electronic apparatus includes: a setting information generating unit and a notifying unit. The setting information generating unit is configured to generate communication setting information to be set to the control driver in order to control this electronic apparatus in the network. The notifying unit is configured to notify an information processing terminal that is not connected to the network of the communication setting information generated by the setting information generating unit.

These and other objects, features and advantages of the present disclosure will become more apparent upon reading of the following detailed description along with the accompanied drawings.

DETAILED DESCRIPTION

Hereinafter, an embodiment of the present disclosure will be explained with referencing drawings in detail. Hereinafter, the present disclosure is embodied as a communication establishment assisting system for a digital multi function peripheral being an electronic apparatus.

Figure 1:
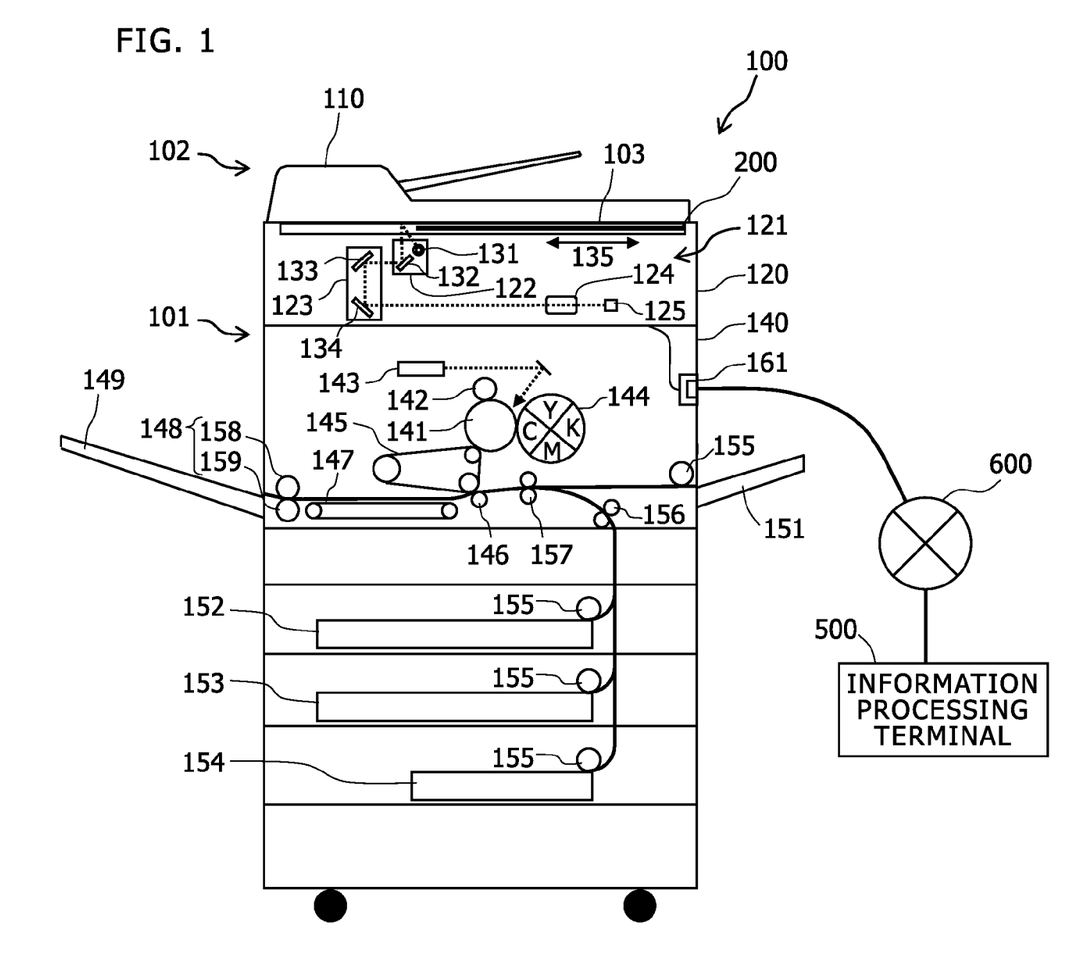
FIG. 1 shows a schematic diagram which indicates a whole configuration of a multi function peripheral in an embodiment of the present disclosure.

FIG. 1 shows a schematic diagram which indicates a whole configuration of a multi function peripheral being an electronic apparatus in an embodiment of the present disclosure. As shown in FIG. 1, the multi function peripheral 100 includes a main body unit 101 and a platen cover 102 arranged on the main body unit 101, and the main body unit 101 includes an image scanning unit 120 and an image forming unit 140. A platen glass 103 is arranged on the top surface of the main body unit 101, and the platen cover 102 is opened and closed on the platen glass 103. Further the platen cover 102 is equipped with a document feeding device 110.

The image scanning unit 120 is arranged beneath the platen glass 103. The image scanning unit 120 optically scans an image of the document using a scanning optical system 121 and generates digital data (image data) of the image. The document is put on either the platen glass 103 or the document feeding device 110. The scanning optical system 121 includes a first carriage 122, a second carriage 123, and a condensing lens 124. The first carriage 122 is equipped with a linear light source 131 and a mirror 132, and the second carriage 123 is equipped with mirrors 133 and 134. The light source 131 lights up the document. The mirrors 132, 133, and 134 guide reflection light from the document to the condensing lens 124, and the condensing lens 124 focuses the light on a light receiving surface of a line image sensor 125. In this scanning optical system 121, the first carriage 122 and the second carriage 123 are arranged so as to be capable of a reciprocal motion in a secondary scanning direction 135. Moving the first carriage 122 and the second carriage 123 in the secondary scanning direction 135 enables the image sensor 125 to scan an image of the document put on the platen glass 103. In order to scan an image of the document set on the document feeding device 110, the image scanning unit 120 temporarily fixes the first carriage 122 and the second carriage 123 at an image scanning position, and reads an image of the document which passes through the image scanning position. The image sensor 125 generates image data of the document corresponding to respective colors such as R (red), G (green), and B (blue) from the incident light to the light receiving surface. On the basis of the generated image data, the image forming unit 140 performs printing on a paper sheet. Further, the image data may be transmitted via a network 600 (a first network) to another device by a network adapter 161. In this embodiment, the network 600 is a LAN (Local Area Network) provided in an office or the like and a closed network which can not be accessed from a public network such as Internet.

The image forming unit 140 performs printing on a paper sheet on the basis of image data generated in the image scanning unit 120 or image data received by the network adapter 161 from another device connected to the network 600. The image forming unit 140 includes a photo conductor drum 141. The photo conductor drum 141 rotates at a constant speed in a constant direction. In periphery of the photo conductor drum 141, a charging device 142, an exposure unit 143, a developing device 144, and an intermediate transfer belt 145 are arranged along the rotation direction. The charging device 142 uniformly charges a surface of the photo conductor drum 141. The exposure unit 143 forms an electrostatic latent image on the photo conductor drum 141 by irradiating a light based on the image data onto the uniformly charged surface of the photo conductor drum 141. The developing device 144 forms a toner image by attaching toner to the electrostatic latent image. The intermediate transfer belt 145 transfers the toner image on the photo conductor drum 141 to a paper sheet. If the image is a color image, the intermediate transfer belt 145 transfers the toner images of respective colors to a single paper sheet. If the image data has the RGB format, the image data is converted to image data of the CMYK format (C: Cyan, M: Magenta, Y: Yellow, K: Black), and the image data of respective colors CMYK is inputted to the exposure device 143.

The image forming unit 140 feeds a paper sheet to a transferring position between the intermediate transfer belt 145 and a transferring roller 146 from a manual bypass tray 151, paper sheet cassettes 152, 153, and 154, and so forth. The manual bypass tray 151 and the paper sheet cassettes 152, 153, and 154 are capable of accepting and storing various sizes of paper sheets. The image forming unit 140 selects a paper sheet specified by a user or a paper sheet corresponding to a document size automatically detected, and feeds the selected paper sheet from the manual bypass tray 151 and the cassettes 152, 153, and 154 by a feeding roller 155. The fed paper sheet is transported to the transferring position by a transportation roller 156 and a paper stop roller 157. The paper sheet on which a toner image has been transferred is transported to a fuser 148 by a transportation belt 147. The fuser 148 includes a fusing roller 158 including a heater, and a pressure roller 159, fixes the toner image on the paper sheet by heating and pressurizing. The image forming unit 140 outputs the paper sheet which passed through the fuser 148 to an output tray 149.

As mentioned below, in this embodiment, the image forming apparatus 100 is controlled by an information processing terminal 500 connected to the network 600.

Figure 2:
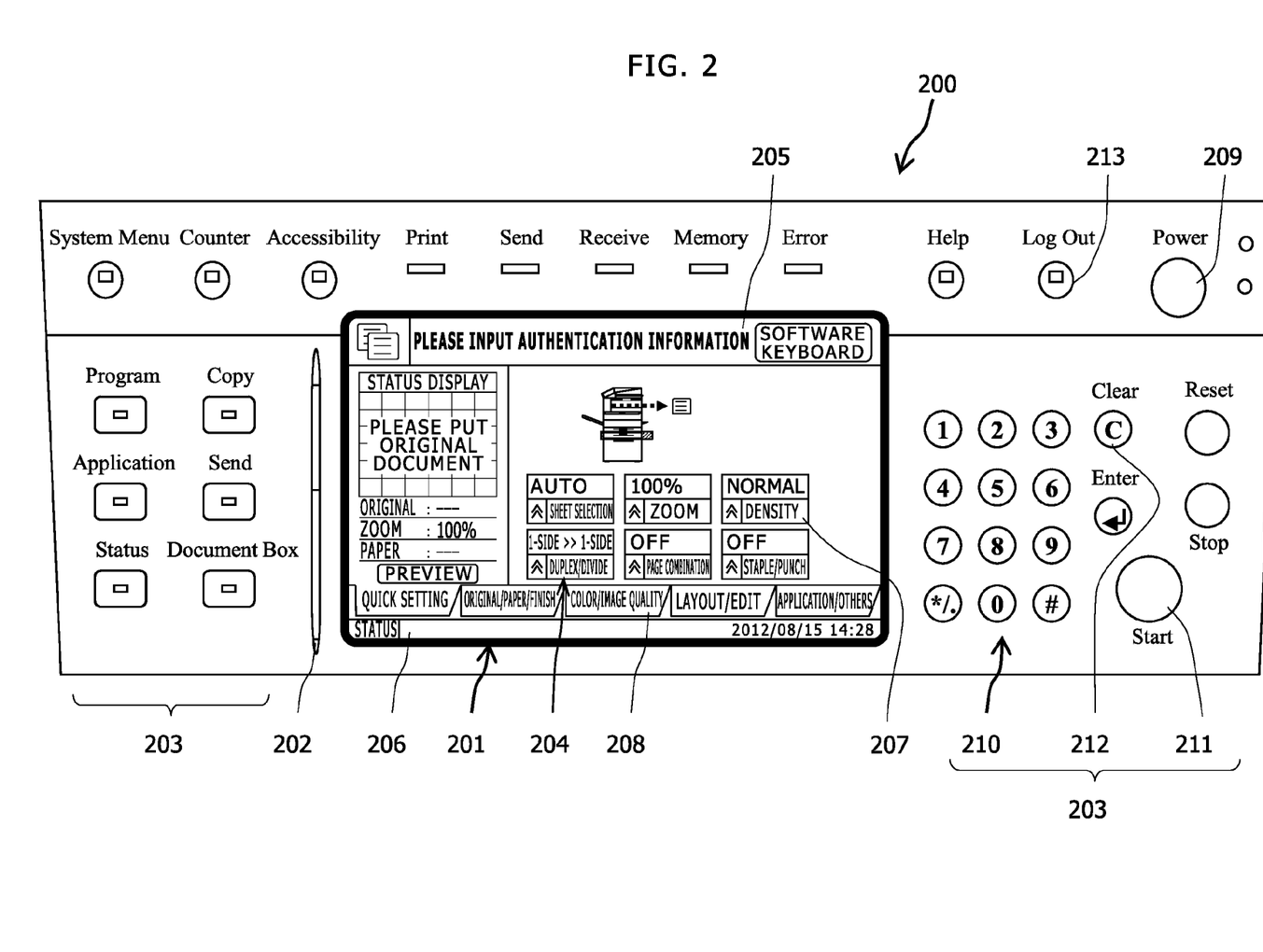
FIG. 2 shows a schematic diagram which indicates an operation panel of a multi function peripheral in an embodiment of the present disclosure.

FIG. 2 shows an example of an appearance of an operation panel which the multi function peripheral is equipped with. A user uses the operation panel 200 to give an instruction such as starting a copy action to the multi function peripheral 100 and to confirm a status or a setting of the multi function peripheral 100. In the operation panel 200, a display 201 equipped with a touch panel and an operation key 203 are arranged. The display 201 includes a displaying surface such as a crystal liquid display which displays an operation button, a message, and so forth, and a sensor which detects a pressed-down position on the displaying surface. The detecting method of the pressed-down position is not limited. The detecting method may be a resistive membrane method, a capacitive sensing method, a Surface Acoustic Wave method, an electromagnetic method, or any other method. A user can perform input using the user's finger or a touch pen 202 on the display 201.

The display 201 displays an operation screen which includes a button displaying part 204, a message displaying part 205, and a status displaying part 206. The button displaying part 204 includes plural tabs 208, and in each of the tabs 208, operation buttons corresponding to a category of the tab are arranged. "QUICK SETTING" tab includes operation buttons used for basic setting. In an example shown in FIG. 2, operation buttons used for setting of a paper size, a copy zooming magnification, a density, a printing side, a page combination, and a post processing. For example, if a user presses down "DENSITY" button 207, a pop-up screen is displayed over this operation button, and the pop-up screen includes selection buttons such as "light", "normal", and "dark" used to select a density, and a density of the selection button selected (pressed-down) by the user is set as a setting value. In an example shown in FIG. 2, other than "QUICK SETTING" tab, "ORIGINAL/PAPER/FINISH" tab, "COLOR/IMAGE QUALITY" tab, "LAYOUT/EDIT" tab, and "APPLICATION/OTHERS" tab are arranged. A user can change the displayed tab to another tab by performing a selecting operation of the tab button 208. While one of the tabs is selected and displayed, the other tabs and the other components are behind the displayed tab.

In the message displaying part 205, a message to inform a setting to a user is displayed, such as whether a copy function is available or not and the number of copies. It should be noted that the multi function peripheral 100 of this embodiment is configured to perform a user authentication process (i.e. a login process) to confirm usage authority of a user (i.e. an operator) when the user uses this multi function peripheral 100. FIG. 2 shows a status before performing the user authentication process, and therefore, a message "PLEASE INPUT AUTHENTICATION INFORMATION" is displayed to request the input of authentication information. Here a user inputs the authentication information using the numeric keys 210, a software keyboard displayed on the touch panel 201 when necessary, or the like. Otherwise, a user inputs an instruction which includes the authentication information through the network adapter 161.

In the status displaying part 206, device status information is displayed when necessary. The device status information is displayed on the basis of detection results of various sensors arranged in the multi function peripheral 100. The device status information means a message to inform warning to a user and prompt the user to correct a malfunction even though the multi function peripheral 100 can continue to run. For example, the device status information may include a message that the residual amount of paper sheets is small, a message that the platen glass 103 is unclean, a message that a facsimile document is stored in a memory if memory receiving of facsimile has been set, and so forth. Further, the device status information may indicate paper sheet empty or a jam.

The operation keys 203 include a main power key 209, numeric keys 210, a start key 211, a clear key 212, a logout key 213, and so forth. For example, the main power key 209 is used to switch on/off the power supply to the multi function peripheral 100. The numeric keys 210 can be used for setting of the number of copies and a copy zooming magnification. When a user performs setting of them, the multi function peripheral 100 displays a message such as "Ready to copy (with setting)" in the message displaying part 205 to inform that the user performs setting. The start key 211 is used for an instruction to start a copy action or an image printing. The clear key 212 is operated by a user when the user cancels the setting inputted by the user. The aforementioned message enables a user to confirm that the setting the user inputted has been accepted, and therefore if the setting becomes unnecessary, the user can operate the clear key 212. This embodiment is configured to prohibit operations using the operation panel 200 except for inputting information on the authentication until usage authority of the user is confirmed in the aforementioned user authentication process, but the configuration is not limited to this. The multi function peripheral 100 is configured to return to the status before performing the authentication process, either when the authenticated user presses down the logout key 213 after using the multi function peripheral or when a predetermined time elapses without any operations to the operation panel 200 and any actions of the image scanning unit 120 and the image forming unit 140 after the authentication. If the instruction which includes the authentication information is inputted through the network adapter 161, then after the authentication, it is permitted to perform only a job of this instruction.

Figure 3:
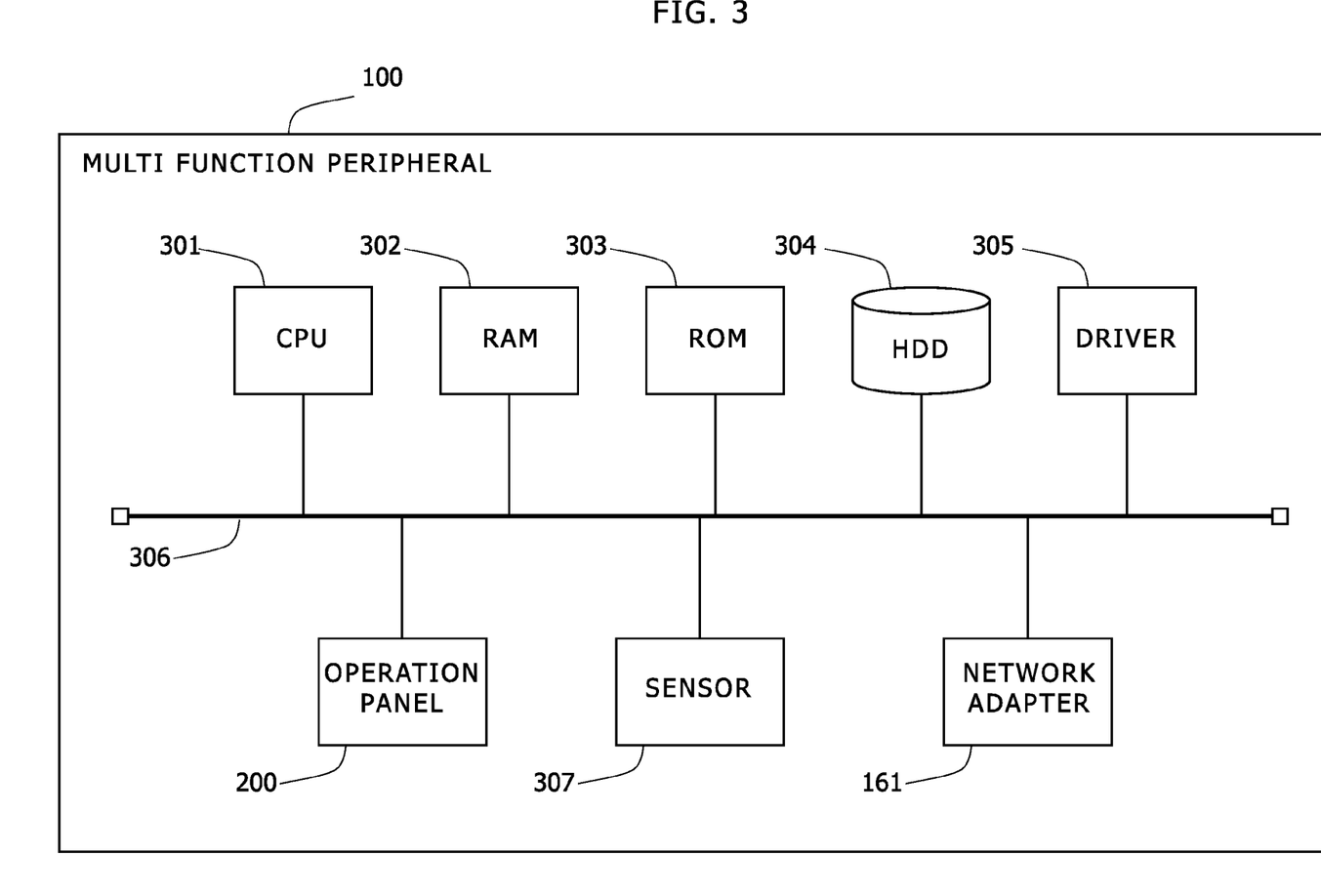
FIG. 3 shows a diagram which indicates a hardware configuration of a multi function peripheral of the present disclosure.

FIG. 3 shows a diagram which indicates a hardware configuration of a control system in the multi function peripheral. In the multi function peripheral 100, an internal bus 306 connects a CPU (Central Processing Unit) 301, a RAM (Random Access Memory) 302, a ROM (Read Only Memory) 303, an HDD (Hard Disk Drive) 304, and drivers 305 corresponding to respective driving units in the document feeding device 110, the image scanning unit 120, and the image forming unit 140. Control programs have been stored in the ROM 303, the HDD 304, and so forth, and the CPU 301 controls the multi function peripheral 100 according to instructions in the control programs. For example, the CPU 301 uses the RAM 302 as a work area, and controls actions of the driving units with transmitting/receiving data and instruction to/from the drivers 305. Further, the HDD 304 is used to store image data generated by the image scanning unit 120 and image data received through the network adapter 161 from another device.

The internal bus 306 is also connected to the operation panel 200, the network adapter 161, and sorts of sensors 307. The operation panel 200 receives a user operation, and provides a signal based on the user operation to the CPU 301. The display 201 of the operation panel 200 displays the aforementioned operation screen on the basis of a control signal from the CPU 301. The sensors 307 include a sensor which detects opening/closing the platen cover 102, a document detection sensor of the platen glass 103, a temperature sensor of the fuser 148, and a sensor which detects a paper sheet or a document on their transportation path.

The CPU 301 forms the following units (function blocks) by executing a program, for example stored in the ROM 303, and controls actions of the units on the basis of signals from the sensors.

Figure 4:
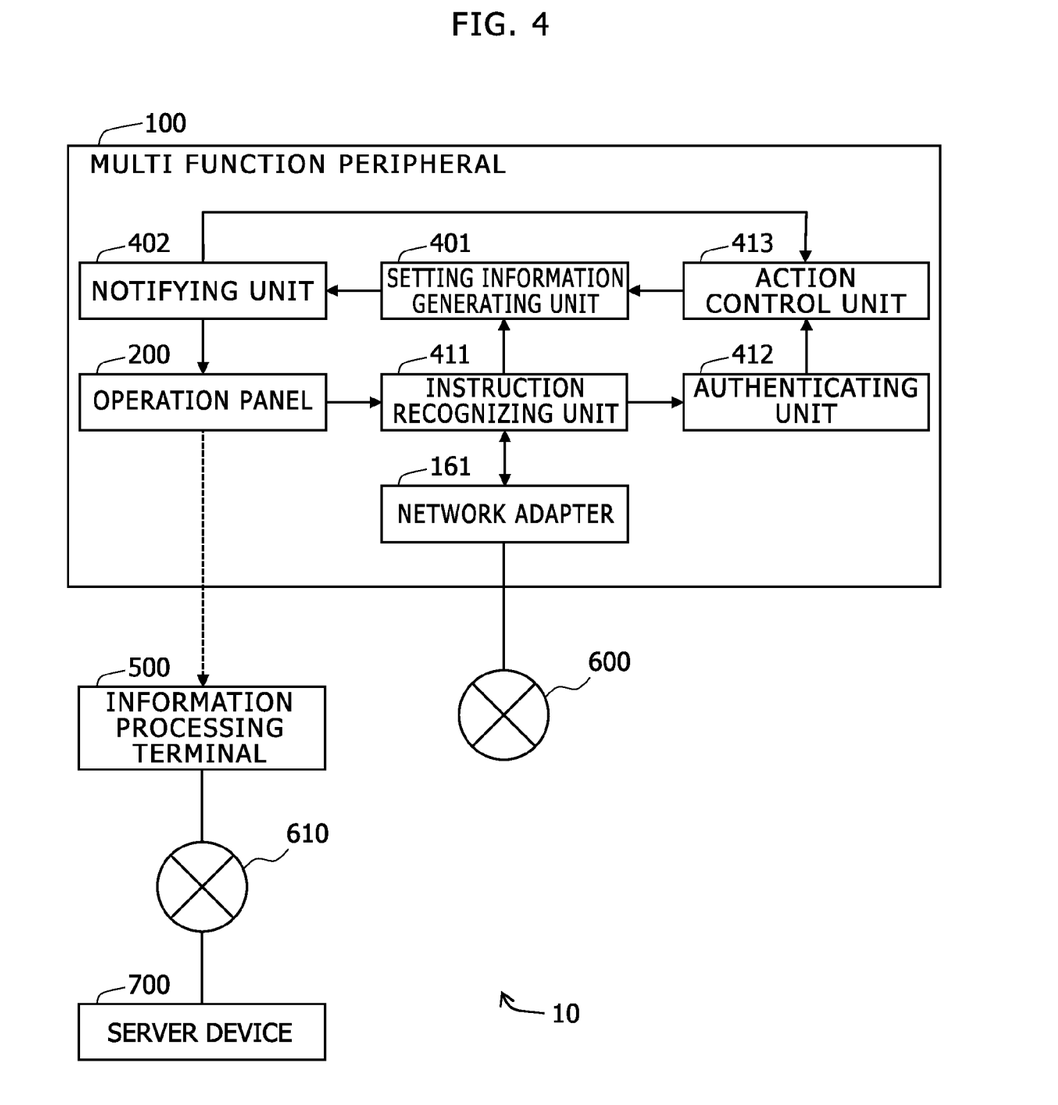
FIG. 4 shows a functional block diagram which indicates a communication establishment assisting system in an embodiment of the present disclosure.

FIG. 4 shows a functional block diagram which indicates a communication establishment assisting system of this embodiment. The communication establishment assisting system 10 provides a control driver to control the multi function peripheral 100 to an information processing terminal 500. This information processing terminal 500 is not connected to the network 600 on which the multi function peripheral 100 is arranged. In the following part, a case is explained in which the control driver is a printer driver, and the information processing terminal 500 is temporarily connected to the network 600 to cause the multi function peripheral 100 to perform printing. However, the condition is not limited to this. It should be noted that an owner of the information processing terminal 500 is a person such as a guest or a colleague on a business trip who does not have usage authority of the multi function peripheral 100, and with assistance of a user who has usage authority of the multi function peripheral 100, this person can temporarily use the multi function peripheral 100, as explained below.

As shown in FIG. 4, the communication establish assisting system 10 includes the multi function peripheral 100, the information processing terminal 500, and a server device 700. The information processing terminal 500 is any information processing device such as a note-type personal computer and a mobile information terminal and any terminal with which the owner wants to use the multi function peripheral 100. The server device 700 is connected to a public network 610 (a second network) such as Internet, and the information processing terminal 500 can be connected to the server device 700 using a browser to communicate with the server device 700. It should be noted that the server device 700 is arranged in a business place of a manufacturer of the printer driver (i.e. a manufacturer of the multi function peripheral 100), and managed by the manufacturer of the printer driver.

The multi function peripheral 100 includes a setting information generating unit 401 and a notifying unit 402. Further, in this example, the multi function peripheral 100 includes an instruction recognizing unit 411, an authenticating unit 412, and an action control unit 413.

The instruction recognizing unit 411 recognizes a content of a user's instruction on the basis of a pressing-down operation to the operation key 203 or the display 201 in the operation panel 200 or an instruction inputted via the network adapter 161. For example, if a sensor which detects a pressed-down position on the display 201 inputs coordinate values of the detected pressed-down position to the instruction recognizing unit 411, the instruction recognizing unit 411 recognizes the content of the user operation to the display 201 on the basis of coordinate values of screen components such as operation buttons known by itself and the inputted coordinate values. The operation which the instruction recognizing unit 411 recognized is inputted to the authenticating unit 412.

The authenticating unit 412 performs user authentication by identifying whether or not user authentication information included in either an operation to the operation panel 200 or an instruction inputted via the network adapter 161 satisfies a preset authentication condition. For example, a user inputs user authentication information using the numeric keys 210 or a software keyboard displayed on the touch panel 201 when necessary. Otherwise, a user inputs an instruction which includes the authentication information through the network adapter 161. Any information capable of identifying the user is used as the user authentication information. In this embodiment, a user ID uniquely assigned to each user and a password corresponding to the user are used as the user authentication information.

In this embodiment, a permitted-user list has been registered in the authenticating unit 412 in advance. The permitted-user list includes a user ID of a user permitted to use the multi function peripheral 100 and a password corresponding to the user. If the user ID and the password inputted from the operation panel 200 or the network adapter 161 are the same as ones in the permitted-user list, the authenticating unit 412 identifies that the authentication condition is satisfied. The authenticating unit 412 permits the user to use the multi function peripheral 100 (generating image data with the image scanning unit 120, printing on the basis of image data with the image forming unit 140, and so forth) if the authentication condition is satisfied, and prohibits the user from using the multi function peripheral 100 if the authentication condition is not satisfied. In this embodiment, the multi function peripheral 100 is configured so that the action control unit 413 performs sorts of processes on the basis of a user instruction recognized by the instruction recognizing unit 411. The sorts of processes are available after the authenticating unit 412 releases action restriction on the action control unit 413.

The setting information generating unit 401 generates communication setting information which includes information uniquely identifying the multi function peripheral 100. The communication setting information includes all information that the printer driver requires in order to control the multi function peripheral 100, and is used by the information processing terminal 500 in order to obtain the printer driver from the server device 700. Here the setting information generating unit 401 generates the communication setting information which includes fixed information and changing information, but the communication setting information is not limited to this.

The fixed information is information which is not changed after the multi function peripheral 100 is manufactured. For example, the type and the serial number of the multi function peripheral 100 are classified as the fixed information. The changing information is information which is changed after the multi function peripheral 100 is manufactured. For example, a network address (e.g. IP address), a machine name on the network 600, and user authentication information to use the multi function peripheral 100 are classified as the changing information. As mentioned below, the fixed information is mainly used to identify a printer driver in the server device 700, and the changing information is mainly used as information set to the printer driver. It should be noted that the user authentication information included in the communication setting information may be authentication information of a user who makes the communication setting information or guest user authentication information which is prepared by an administrator for a temporal usage. In case of the former, a user can not make communication setting information which permits to use the multi function peripheral 100 over the user's authority.

A storage place of the fixed information and the changing information in the multi function peripheral 100 has been registered in the setting information generating unit 401, and the setting information generating unit 401 refers to the registered storage place to generate the communication setting information. Further, in this embodiment, sorts of restriction can be included in the communication setting information when the communication setting information is generated. The restriction, for example, is restriction of available functions in the multi function peripheral 100, restriction of the number of jobs to be transmitted to the multi function peripheral 100, restriction of available date and time of the multi function peripheral 100, or a combination of two or more of them.

The generation of the communication setting information in the setting information generating unit 401 is started by a user instruction through the operation panel 200. In the multi function peripheral 100, a communication setting information generating button is arranged in "APPLICATION/OTHERS" tab in the operation screen displayed on the display 201, and upon pressing down the communication setting information generating button, the communication setting information is generated.

The notifying unit 402 notifies the user who instructed to generate the communication setting information of the communication setting information generated by the setting information generating unit 401. This notification can be performed in any manner capable of letting the user know the information, such as displaying, printing matter, or email. Here the notifying unit 402 displays the communication setting information on the display 201 of the operation panel 200.

The notifying unit 402 displays an access keyword as the communication setting information, although displaying the communication setting information is limited to this manner. The access keyword is obtained by using a compact code such as Huffman code or arithmetic code in order to shrink a string length of the communication setting information.

Figure 5:
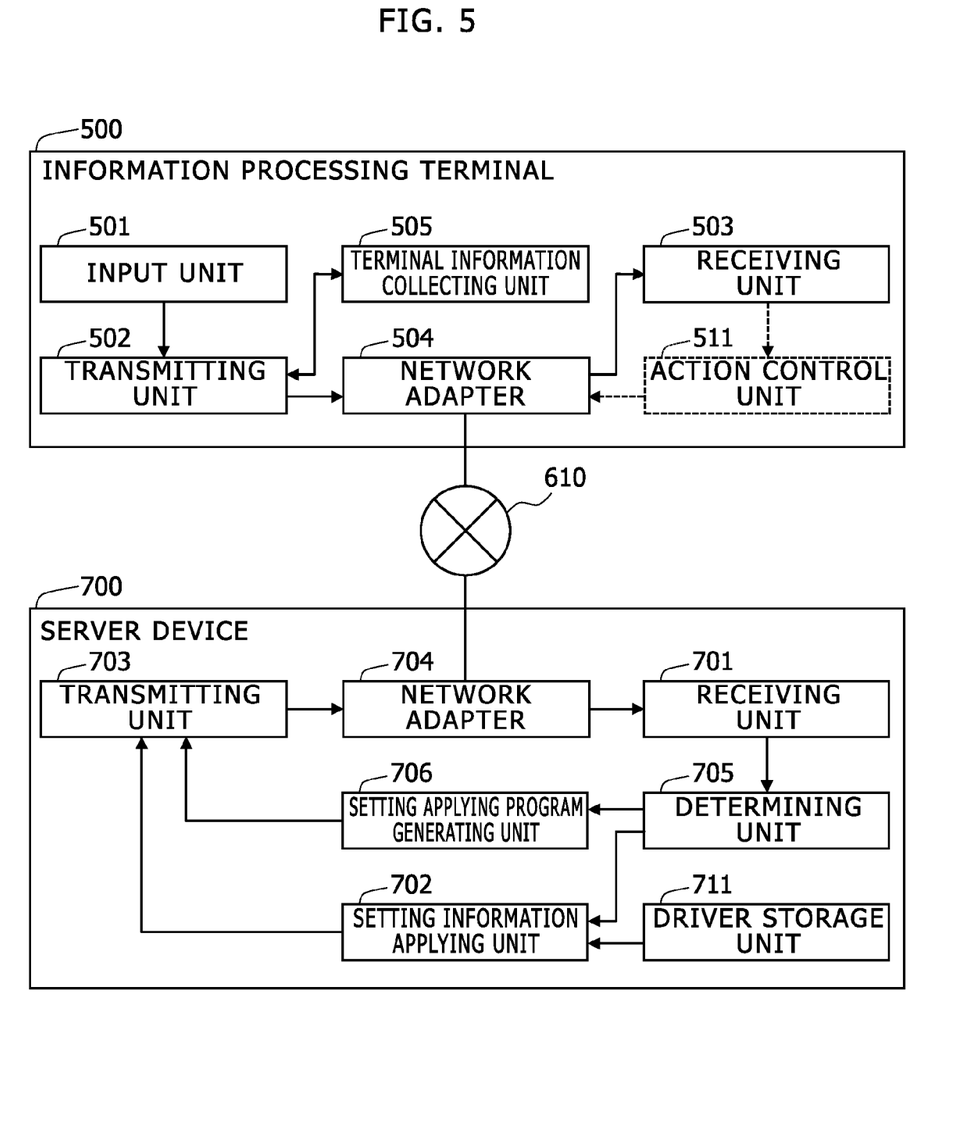
FIG. 5 shows a functional block diagram which indicates a communication establishment assisting system in an embodiment of the present disclosure.

In the next part, the information processing terminal 500 and the server device 700 are explained. FIG. 5 shows a functional block diagram which indicates the information processing terminal 500 and the server device 700. As shown in FIG. 5, the information processing terminal 500 includes an input unit 501, a transmitting unit 502, and a receiving unit 503. Further, the information processing terminal 500 includes a terminal information collecting unit 505. It should be noted that the information processing terminal 500 includes a CPU, a RAM, a ROM, and an HDD as well as the multi function peripheral 100. The CPU forms the following processing units, for example, by executing a program stored in the ROM or the HDD using the RAM as a work area.

To the input unit 501, communication setting information (an access keyword) generated in the multi function peripheral 100 is inputted. The transmitting unit 502 transmits information inputted to the input unit 501 via the network adapter 504 to the server device 700. The receiving unit 503 receives either a printer driver to control the multi function peripheral 100 or a setting applying program mentioned below via the network adapter 504 from the server device 700.

In this embodiment, the information processing terminal 500 is configured to access the server device 700 using a browser, and this browser acts as the input unit 501, the transmitting unit 502, and the receiving unit 503, although the configuration is not limited to this. Therefore, if a URL (Uniform Resource Locator) is inputted to the browser to access the server device 700, then the browser displays an input screen as the input unit 501 on its display screen in order for a user to input communication setting information. This URL may be included in the communication setting information. However, in this embodiment, as mentioned, the server device 700 is managed by the manufacturer of the printer driver, and therefore, a user easily makes access the server device 700 by inputting a specified URL of a home page managed by the manufacturer.

If communication setting information (an access keyword) is inputted to the input unit 501, the browser acts as the transmitting unit 502 and transmits the communication setting information expressed as the access keyword to the server device 700. Upon receiving the communication setting information, the server device 700 transmits a control driver corresponding to the received communication setting information (here a printer driver) to the information processing terminal 500. The browser of the information processing terminal 500 acts as the receiving unit 503 and receives it.

Further, in this embodiment, after the transmitting unit 502 includes information on the information processing terminal 500 in the communication setting information, the transmitting unit 502 transmits the communication setting information to the server device 700. This information on the information processing terminal 500 includes, for example, OS information indicating an OS of the information processing terminal 500, driver information indicating a driver which has been installed, information uniquely specifying the information processing terminal 500, and so forth. The OS information and the driver information are used to specify a suitable printer driver; and the information uniquely specifying the information processing terminal 500 is used to limit a terminal permitted to use the printer driver to the information processing terminal 500. For example, a name of the information processing terminal 500 or a product key of the OS can be used as the information uniquely specifying the information processing terminal 500. It should be noted that the browser acts as the terminal information collecting unit 505 and obtains the information on the information processing terminal 500.

On the other hand, the server device 700 includes a receiving unit 701, a setting information applying unit 702, and a transmitting unit 703. The server device 700 also includes a determining unit 705 and a setting applying program generating unit 706. It should be noted that the server device 700 includes a CPU, a RAM, a ROM, and an HDD as well as the multi function peripheral 100. The CPU forms the following processing units, for example, by executing a program stored in the ROM or the HDD using the RAM as a work area.

The receiving unit 701 receives the communication setting information transmitted from the information processing terminal 500 via the network adapter 704, and inputs the communication setting information to the determining unit 705. The determining unit 705 determines whether a required printer driver has been installed in the information processing terminal 500 or not on the basis of the driver information included in the communication setting information.

If the required printer driver has not been installed in the information processing terminal 500, the setting information applying unit 702 applies information required to control the multi function peripheral 100 to the printer driver on the basis of the changing information included in the communication setting information received by the receiving unit 701. Applying this information may not be performed directly to the printer driver itself, and but performed as providing a setting condition, which is applied to the driver by a program executed together when the driver is installed in the information processing terminal 500.

Installing this printer driver to the information processing terminal 500 enables the information processing terminal 500 to control the multi function peripheral 100 (here for printing) when the information processing terminal 500 is connected to the network 600 on which the multi function peripheral 100 is arranged. It should be noted that in the server device 700, sorts of drivers are stored in a driver storage unit 711, and the setting information applying unit 702 is configured to extract a corresponding driver on the basis of the fixed information included in the inputted communication setting information.

If the required printer driver has been installed in the information processing terminal 500, the setting applying program generating unit 706 generates a setting applying program on the basis of the communication setting information. The setting applying program is to apply the communication setting information to the printer driver which has already been installed in the information processing terminal 500.

The transmitting unit 703 transmits either the printer driver to which the setting information applying unit 702 has applied the communication setting information or the setting applying program generated by the setting applying program generating unit 706 via the network adapter 704 to the information processing terminal 500.

Figure 6:
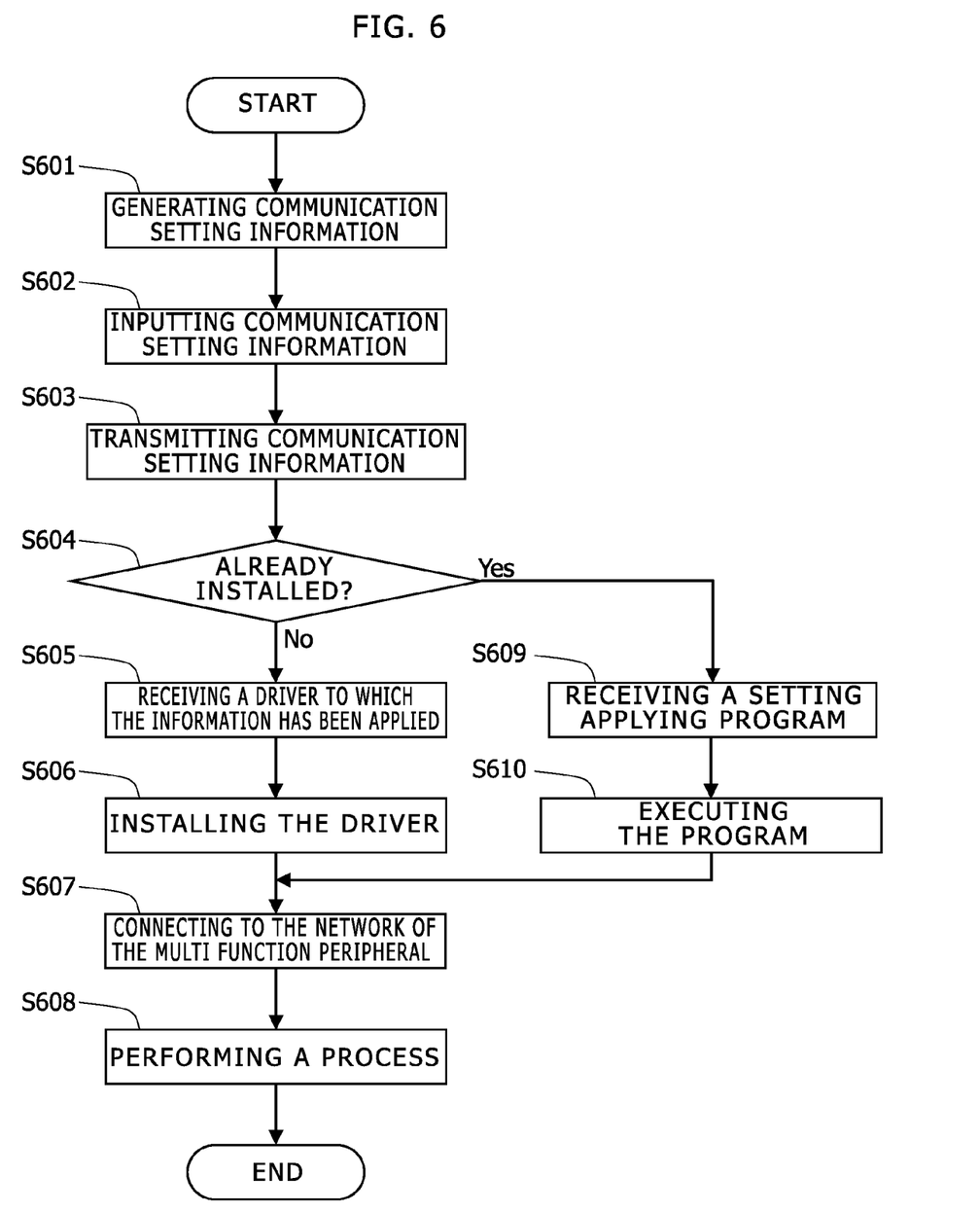
FIG. 6 shows a flowchart which indicates an example of communication establishment assisting procedures in an embodiment of the present disclosure.

FIG. 6 shows a flowchart which indicates an example of communication establishment assisting procedures performed by the communication establishment assisting system 10. Each of the aforementioned processes is performed in turn in the multi function peripheral 100, the information processing terminal 500, or the server device 700, and the flowchart expresses a series of the processes.

In these procedures, in the aforementioned manner, the multi function peripheral 100 generates communication setting information (Step S601). As mentioned, the generated communication setting information (the access keyword) is displayed on the display 201 of the multi function peripheral 100. A user who instructed to generate the communication setting information records (e.g. writes down) the access keyword.

The user uses the browser of the information processing terminal 500 that the user wants to enable to use the multi function peripheral 100, and accesses the server device 700 using the browser, and inputs the access keyword into the displayed input screen (Step S602).

The access keyword is a meaningless string with a shrunk string length, and therefore no security problems arise even though the owner of the information processing terminal 500 inputs the access keyword. Further, it is possible to input the access keyword without a manual operation. For example, it may be configured to display a 2D code such as QR code (trademark) as the access keyword with information indicating an address of the server device 700 on the display 201, and to input the access keyword by taking an image of the 2D code using the information processing terminal 500. For example, if the access keyword is "x87zn32m", then the displayed 2D code indicates "http://www.abcd.com&sid=x87zn32m". If the information processing terminal 500 has no imaging function, for example, it may be configured to take an image of the 2D code using a mobile communication terminal, and transmit the image or its content, i.e. the access keyword to the information processing terminal 500 using Bluetooth (trademark), infrared communication or the like. Otherwise, the access keyword may be directly transmitted from the multi function peripheral 100 to the information processing terminal 500 using Bluetooth (trademark), infrared communication or the like.

Upon receiving the input of the access keyword, the information processing terminal 500 transmits the communication setting information to the server device 700, as mentioned (Step S603). In the server device 700 which received the communication setting information, the determining unit 705 determines whether a required driver has been installed in the information processing terminal 500 or not on the basis of the information on the information processing terminal 500 included in the communication setting information (Step S604).

If the required driver has not been installed in the information processing terminal 500, the determining unit 705 inputs the communication setting information to the setting information applying unit 702 (No at Step S604). Subsequently, the setting information applying unit 702 applies the inputted communication setting information to a required printer driver to be transmitted to the information processing terminal 500. In this manner, information required to control the multi function peripheral 100 is set in the printer driver. The setting information applying unit 702 inputs the printer driver to which the communication setting information has been applied to the transmitting unit 703, and causes to transmit it to the information processing terminal 500.

Upon receiving the printer driver to which the communication setting information has been applied, the information processing terminal 500 installs this driver to itself and consequently forms an action control unit 511 which controls the multi function peripheral 100; and the information processing terminal 500 is enabled to use the multi function peripheral 100 for printing when the information processing terminal 500 is connected to the network 600 on which the multi function peripheral 100 is arranged (Steps S605, S606, S607, and S608).

Otherwise, if the required driver has been installed in the information processing terminal 500, the determining unit 705 inputs the communication setting information to the setting applying program generating unit 706 (Yes at Step S604). Subsequently, the setting applying program generating unit 706 generates a setting applying program based on the inputted communication setting information. The setting applying program is to apply the inputted communication setting information to the printer driver which has been installed in the information processing terminal 500. The setting applying program generating unit 706 inputs the generated setting applying program to the transmitting unit 703, and causes the transmitting unit 703 to transmit it to the information processing terminal 500.

Upon receiving the setting applying program, the information processing terminal 500 executes this program and consequently is enabled to use the multi function peripheral 100 for printing when the information processing terminal 500 is connected to the network 600 on which the multi function peripheral 100 is arranged (Steps S605, S606, S607, and S608).

As mentioned, in the communication establishment assisting system 10, in the situation that the information processing terminal 500 is not connected to the network 600 on which the multi function peripheral 100 is arranged, it is possible to obtain the printer driver to which the communication setting information required to control the multi function peripheral 100 has been applied from the server device 700 via the network 610 to which the information processing terminal 500 can connect. After the driver is installed in the information processing terminal 500, the information processing terminal 500 is enabled to control the multi function peripheral 100 when the information processing terminal 500 is connected using wired communication or wireless communication to the network 600 on which the multi function peripheral 100 is arranged. Therefore, it is possible to easily install the driver to the information processing terminal 500 without searching it on the network while the information processing terminal 500 is connected to the network 600.

Further, in the communication establishment assisting system 10, the information uniquely identifying the multi function peripheral 100 on the network 600 is included in the communication setting information, and therefore, even if plural multi function peripherals of a same type are arranged on the network 600, it is possible to properly control a desired multi function peripheral.

Further, in the communication establishment assisting system 10, the communication setting information includes the fixed information which is not changed after manufacture. Therefore, if a serial number or the like is used as the fixed information, information on a configuration (e.g. including a finisher or not or including a sorter or not) of the multi function peripheral can be included in the communication setting information. Therefore, it is possible to obtain drivers as a driver package corresponding to the configuration of the multi function peripheral from the server device 700.

Furthermore, in the communication establishment assisting system 10, the communication setting information includes the information on the information processing terminal 500, and therefore, if necessary, it is possible to provide a driver which is available only in the information processing terminal 500. Therefore, it is possible to prohibit undesired information processing terminals from using the multi function peripheral 100.

In addition, in the communication establishment assisting system 10, if a required driver has been installed in the information processing terminal 500, a setting applying program is generated and transmitted instead of the driver. In the information processing terminal 500, when the setting applying program is executed, the communication setting information transmitted from the information processing terminal 500 is applied to the control driver which has been installed. Therefore, it is possible to easily perform setting so as to be enabled to control the multi function peripheral 100 using the existent control driver.

Further, in the communication establishment assisting system 10, it is possible to obtain the driver and permit temporal usage without an administrator of the multi function peripheral and lowering its security level.

It should be noted that an embodiment which includes the determining unit 705 and the setting applying program generating unit 706 is mentioned above, but these components are not necessary components in the present disclosure. For example, even if the system is configured without these components, the driver is obtained from the server device 700 every time, and in this case, it still has the advantage that the information processing terminal 500 not connected to the network 600 on which the multi function peripheral 100 is arranged is easily set to a status enabled to use the multi function peripheral 100.

Further, the aforementioned embodiment is configured so that the information processing terminal 500 transmits the communication setting information included information on itself. However, if information on the information processing terminal 500 is not necessary for setting items of the driver, it is not required to include the information on the information processing terminal 500 into the communication setting information.

Further, an embodiment in which the multi function peripheral 100 includes the setting information generating unit 401 is mentioned above, but the multi function peripheral 100 may not include the setting information generating unit 401. For example, an administrator shows the communication setting information of this multi function peripheral on a body or the like of this multi function peripheral, such as information in which an IP address set to the multi function peripheral is attached to a serial number of the multi function peripheral, and consequently it is possible to use this communication setting information to obtain a driver corresponding to this multi function peripheral from the server device. This configuration can be easily applied to a low cost machine.

Further, in the aforementioned embodiment, explained is a combination of a multi function peripheral and an information processing terminal located in an office or the like. In addition, it can apply to a combination of a multi function peripheral located in a convenience store and a mobile information terminal such as a smart phone. In this case, for example, when a photograph stored in the mobile information terminal is printed, high speed printing via a network is available.

Further, in the aforementioned embodiment, the multi function peripheral is indicated as an example of the electronic apparatus, and the printer driver is indicated as an example of the control driver. Alternatively, the electronic apparatus may be any electronic apparatus connected to a network, and the control driver may be a control driver to control such an electronic apparatus. Further, in the aforementioned embodiment, explained is the case focusing on obtaining the driver for temporal usage. Of course, it can apply to obtaining the driver for ordinary usage.

As mentioned, according to the present disclosure, it is possible to easily install a driver in a terminal to control an electronic apparatus arranged on a network even if the terminal is not connected to the network. Therefore, it is possible to set the information processing terminal to a status enabled to use the electronic apparatus, without searching on a network while the information processing terminal is connected to the network. The electronic apparatus is not limited to a specific type and it is capable of easily applying to a low cost machine.

The description has been presented for purposes of illustration and description, and is not intended to be exhaustive or limited to the present disclosure.

For example, in the aforementioned embodiment, obtaining only the control driver is described, and in addition, if a management software has been launched, the server device may be configured to identify the software on the basis of the fixed information included in the communication setting information, and display information on the software together or a link to a web page which displays the information.

Further, it is possible to properly change the order of the procedures in the flowchart shown in FIG. 6 if the changed order results in the equivalent effect.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. A communication establishment assisting system, comprising:
    an electronic apparatus arranged on a first network and configured to be controlled by an information processing terminal that a control driver is installed in; and
    a server device arranged on a second network different from the first network and configured to provide the control driver to be installed in the information processing terminal;
    wherein the information processing terminal comprises:
        an input unit that communication setting information is inputted to, the communication setting information including information to uniquely identify the electronic apparatus;
        a transmitting unit configured to transmit the communication setting information to the server device; and
        a receiving unit configured to receive the control driver from the server device to control the electronic apparatus; and
    the server device comprises:
        a receiving unit configured to receive the communication setting information transmitted from the information processing terminal;
        a setting information applying unit configured to apply the received communication setting information to the control driver to be transmitted to the information processing terminal;
        a determining unit configured to determine whether the control driver has been installed in the information processing terminal or not on the basis of the communication setting information; and
        a transmitting unit configured to transmit the control driver to which the communication setting information has been applied to the information processing terminal wherein the transmitting unit will transmit the control driver to the information processing terminal if the determining unit determines that the control driver has not been installed and to not transmit the control driver if the determining unit determines that the control driver has been installed.

2. The communication establishment assisting system according to claim 1, wherein the electronic apparatus comprises:
    a setting information generating unit configured to generate communication setting information including information to uniquely identify this electronic apparatus in the first network as the information to uniquely identify the electronic apparatus; and
    a notifying unit configured to notify outside of the communication setting information generated by the setting information generating unit.

3. The communication establishment assisting system according to claim 2, wherein the transmitting unit of the information processing terminal is further configured to include information on this information processing terminal into the communication setting information to transmit the information on this information processing terminal to the server device.

4. The communication establishment assisting system according to claim 2, wherein the communication setting information includes fixed information and changing information, the fixed information indicates information that is not changed after manufacture, and the changing information indicates information that is changed after manufacture.

5. The communication establishment assisting system according to claim 2, wherein the communication setting information generating unit is further configured to generate plural sets of the communication setting information corresponding to respective uses.

6. The communication establishment assisting system according to claim 3, wherein the server device comprises:
    a setting applying program generating unit configured to generate a setting applying program that applies the communication setting information to the control driver that has been installed, and causes the transmitting unit to transmit the setting applying program instead of the control driver that the communication setting information has been applied to if the determining unit determines that the driver program has been installed.

* * * * *